United States Patent [19]

Kitamura

[11] 4,111,381
[45] Sep. 5, 1978

[54] SUSPENSION SYSTEM OF BOBBIN HANGER

[76] Inventor: Shinzo Kitamura, No. 1-1-18, Deguchi, Hirakata, Japan

[21] Appl. No.: 741,051

[22] Filed: Nov. 11, 1976

[30] Foreign Application Priority Data

Nov. 11, 1975 [JP] Japan .................................. 50-136111
Nov. 11, 1975 [JP] Japan .............................. 50-154028[U]
Nov. 29, 1975 [JP] Japan .............................. 50-161953[U]

[51] Int. Cl.² ......................... B65H 49/02; D03J 5/08
[52] U.S. Cl. .................................................. 242/130.2
[58] Field of Search ............. 242/129.7, 129.72, 130.2; 308/DIG. 8, 238, 239

[56] References Cited

U.S. PATENT DOCUMENTS 2,217,922  10/1940  Sayles et al. ...................... 242/130.2
3,625,452  12/1971  Noguera ............................ 242/130.2
3,921,932  11/1975  Whitehead, Sr. .................. 242/130.2

Primary Examiner—Leonard D. Christian
Attorney, Agent, or Firm—Oblon, Fisher, Spivak, McClelland & Maier

[57] ABSTRACT

The present invention relates to a suspension system of a bobbin hanger rotatably dangling a bobbin around which sliver or rovings are wound up on spinning machines, in the construction of which, for the purpose of deterring the intrusion of dust into a bearing section and urging the latter to smoothly rotate, a cap covers the bearing section with a slide face which is in consonace with a swinging spherical face of the bearing section, which holds a ball race molded of resinous material on a terminal head formed with a spherical surface, such being overlaid by an outer race with a retainer disposed between, and this outer race secures a housing.

7 Claims, 8 Drawing Figures

SUSPENSION SYSTEM OF BOBBIN HANGER

BACKGROUND OF THE INVENTION

1. Field of the Invention

The present invention relates generally to a bobbin hanger of the type which is in general use mostly for feeding spinning machines with rovings. Its construction must be such that the bobbin may be held by the bobbin hanger when it is simply thrust up onto the bobbin hanger, thus applying it thereto, or that the bobbin may be released when thrust up once more, thus to be removed therefrom. Consequently, it is desirable that they both be constructed to rotate freely and uniformly and further to be able to stand long term use. The present invention has been contrived with the object of satisfying these requirements, wherein the bearing section holding the bobbin hanger is so constructed as to be rotated readily and to continue the rotation constantly and uniformly, as a result of deterring the entrance of dust thereinto.

2. Description of the Prior Art

The conventional bobbin hanger used chiefly for spinning machines and mechanical appliances dealing with bobbins has the capability of securing and releasing such bobbins without difficulty. In many cases involved, the barrel body of the bobbin hanger is inserted into a bobbin-supporting hole, which is provided in the upper part of the bobbin, and then supports the bobbin at a shoulder lying between the bobbin-supporting hole and a large diametral hollow part extended at the depths thereof through the medium of two or more fingers or arms projecting in plural directions from the lower part of the barrel body. This kind of bobbin hanger is well known, for example, in the U.S. Pat. Nos. 2,943,812, 2,876,962, 3,065,926 and 3,286,949.

Now, the practicability of easily loading and unloading the bobbin is of course a fine thing, but it is also important that the suspended bobbin may be rotated smoothly and uniformly. Accordingly, almost all bobbin hangers proposed so far have made use of ball bearings, being hung on creel board or creel rail of spinning machines, and being used by the hundreds of thousands, whereby they are required to be offered at light weight and low cost as much as possible. That is why metal material is used only in the principal part of their ball bearing section and the remaining part is made up of synthetic resinous material of good abrasion resistance. The ball bearing thus constructed is supported by a shank penetrating therethrough. Since the ball bearing section, however, is required to rotate and swing with freedom, there must be an adequate clearance between it and the shank. If this clearance is more narrow than necessary, it becomes impossible for the ball bearing section to swing, even though allowed to rotate. It is the problem of this clearance that always perplexes the designer of the ball bearing section. That is to say, there is the possibility of the ingress of dust, such as fly, flint, sand and the like from this clearance in the spinning room where they are suspended in the air in a great measure, therefore either leading to the disturbance of its smooth rotation, which compels the same to be overhauled, or resulting in the impossibility of feeding rovings, so far as spare parts not replaced.

Hereupon, a very careful countermeasure should be taken in order to prevent the intrusion of dust. In the environment of the spinning room, there are intermingled other than fly, etc., dust or powders of sand, iron, magnesium, aluminum and so on. These fine powders often abrade the bearing race of the ball bearing so that the years of endurance of the bobbin hanger are shortened and the durability of the ball bearing section is lowered. Considering these circumstances, hitherto there has been proposed a bobbin hanger of such a kind having a cap for the prevention of dust in the clearance of the ball bearing section, but it has been of a fixed type and rather placed the swing of the supporting barrel body under restraint.

SUMMARY OF THE INVENTION

The present invention has been contrived with a view to eliminating the foregoing defects of the known bobbin hangers.

Accordingly, an object of the present invention is to provide a novel suspension system of a bobbin hanger which is so constructed as to prevent the intrusion of the above mentioned fine powders into the ball bearing section and simultaneously to allow the bobbin hanger to swing with thorough freedom.

Another object of the present invention is to provide a kind of a ball bearing section adapted to the bobbin hanger for permitting smooth rotation of the ball bearng section during the long period of its use.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference numerals designate like or corresponding parts throughout the various views and wherein.

DETAILED DESCRIPTION OF THE INVENTION

Referring to the bobbin hanger, there are various sorts of constructions and means for supporting the bobbin and many proposals have been done hitherto on this subject, but all are the same in the point that they are all constructed to be rotatable and able to swing with freedon, and further they almost all adopt the ball bearing system in the capacity of the means of rotation. However, since the ball bearing section of the bobbin hanger is supporting a light-weight body, as distinct from ball bearings in general machine parts, it is to be noted that it should be constructed in such a way that it can be rotated by a small quantity of starting torque, that it will have no inertia, that it can swing with freedom with respect to the shank, and that it will be able to deter the intrusion of dust. In order to allow, however, for the ball bearing, though constructed as outlined above, to swing while being supported by the shank, there must be a clearance in the upper part thereof, within the region of which the swing motion is permissible. As it is, the very existence of this clearance incurs the intrusion of dust, only to hinder the smooth rotation of the ball bearing. The result is that it becomes impossible to twist thread because of the irregular draft given to rovings. On the other hand, the bell-shaped hanging skirt, inside of which the ball bearing section of the bobbin hanger is housed, is usually formed widely open at its bottom part to permit the bobbin hanger to freely swing, as mentioned above, so that the ascending air current is ready to induce dust therefrom inward of the skirt, finally helping dust to penetrate into the ball bearing.

In the present invention, a cap has been provided in the clearance between the shank and the ball bearing for the purpose of deterring the intrusion of dust into the latter. This cap is so shaped as to be parallel to the top surface of the barrel-body-securing member, which top surface is formed with the top surface of an imaginary sphere generated conforming to the center of the spherical motion of the swing of the ball bearing. In order that the cap will be positively parallel to the top surface of the barrel body-securing member, either a spring can be applied or a flange can be attached to the outer circumference of the bottom of the securing member, if necessary. This flange will be formed to cover the opening part of the skirt so as not to induce the ascending air current directly inward of the skirt. It goes without saying that the quality of materials of which the bearing race, balls, and the other constructions are made are to be selected from among the most suitable for the bobbin hanger.

Figure 1:
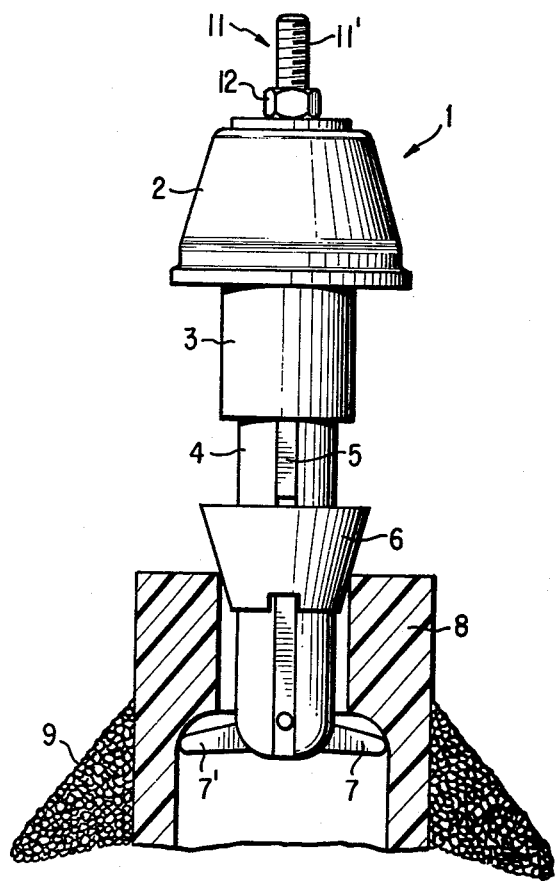
FIG. 1 is a front view of a bobbin hanger as a whole, showing in section a bobbin in the attached state.

FIG. 1 shows an example of a bobbin hanger, and those that follow illustrate the ones in which the present invention has been adapted to the suspension system in similar hangers. As shown, the principal point of the present invention is nothing but one relating to the suspension system of the bobbin hanger. This suspension system or bearing can be applied to whatever mechanism for holding the bobbin. It is for this reason that, in FIG. 1, a hitherto well-known means for holding the bobbin has been shown by way of an example.

In FIG. 1, the reference numeral 1 designates a bobbin hanger as a whole. A bobbin-holding barrel body 4 is formed with a trunk body 3 in one piece, or sometimes separately. In the interior of the barrel body 4, there are a slider and an engaging-releasing means, and on the lower part thereof, provided on the front part of the slider, are fingers 7, 7' which are able to open and close with freedom, or to project and retract in opposite directions to each other, by dint of the slider. On the outer circumference of the barrel body 4, a weight collar 6 is floatingly provided, which is being hitched in down time at the lower part of the barrel body 4. On pushing the collar 6 upward, protruded operators 5, which lie in vertical grooves of the barrel body 4, ascend and stop the slider at its elevated position, and when the collar 6 is pushed further upward, then the engaged slider is released and goes down to make the fingers 7, 7' project outward, as shown in FIG. 1, with the result that the projected fingers come to hold the bobbin 8. Numeral 9 indicates rovings wound up around the bobbin 8. Numeral 2 denotes a skirt covering the top part of the trunk body 3. The skirt serves as a preventive against dust and the regulator of the swing motion of the barrel body 4.

Since the gist of the present invention, as stated before, wholly resides in the construction of the suspension system which supports, rotatably and swingably, the bobbin-supporting barrel body 4 and the trunk body 3, it is a matter of course that the present invention may be well applied to all kinds of working devices for supporting the bobbin proposed so far.

Figure 2:
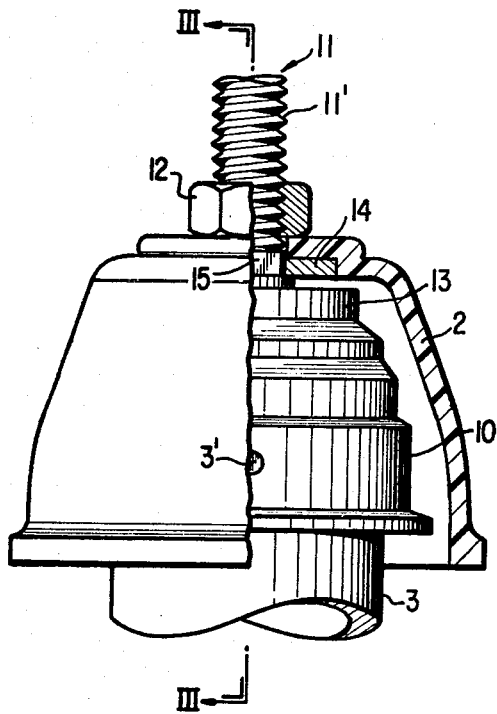
FIG. 2 is an enlarged front view of the suspension section of the bobbin hanger shown in FIG. 1, wherein its skirt is shown as broken away at the right half, illustrating the external appearance of a suspension section according to the present invention.

FIG. 2 represents a part of FIG. 1, as aforesaid, showing the skirt 2 partially cut-away at its right half. The trunk body 3 is here inserted in the lower side of the cavity of the securing member 10. The body 3 and the member 18 extends. The ball bearing, thus constructed is suspended on the shank 11. Thus, the securing member 10 can rotate, while being supported on the spherical terminal head 17 of the shank 11, and is able to swing freely by virtue of the existence of the clearance produced between the hole 23 and the neck part 18 of the shank 11. But, as a matter of fact, the very existence of the clearance is likely to be the cause of the intrusion of dust, or otherwise if this clearance is made narrow, the angle of the swing motion is limited. Further, admitting that a cap plate is to be mounted on the top of the securing member 10, if it is only a flat one, it simply moves up and down in concert with the swing of the securing member 10, only to promote the entrance of dust, or further to involve the uninvited necessity of widening even the clearance with respect to the top of the skirt 2, which has hitherto furthered the trouble of the intrusion of dust all the more.

Such being the case, as a first step of the present invention, the top face of the securing member 10 is formed with a convex spherical surface and the inside impinging face of the cap 13 mounted on the top face is formed with a concave spherical surface, as described before. The centers of these spherical surfaces are constructed by being generated concentrically with the center of the spherical surface of the terminal head 17. A spherical center B, with which as a center the spherical surface 17' of the terminal head 17 is constructed, 10 are connected by a check rod 3' diametrically piercing the overlapping portions thereof. The skirt 2 is nonrotatably fastened to the shank 11 by being tightened with the use of a washer 14, which is disposed on the lower face of the top part of the skirt 2, from below and a nut 12 from above.

Figure 3:
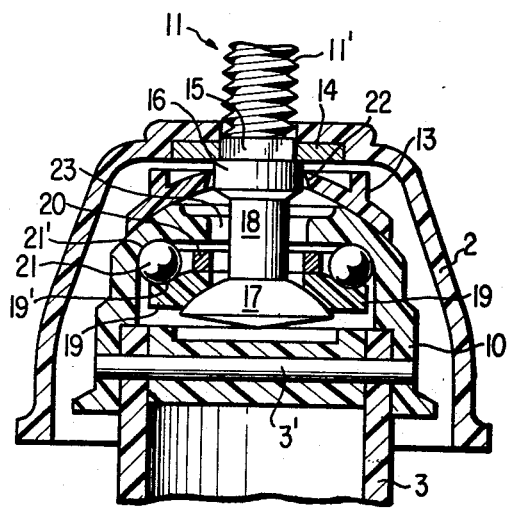
FIG. 3 is a sectional view taken on the line III—III of FIG. 2.
Figure 5:
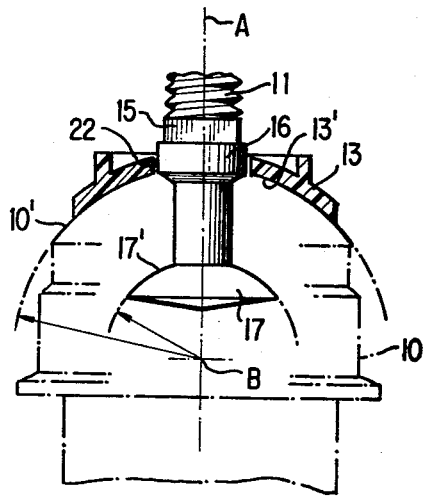
FIG. 5 is a schematic view, illustrating the construction of a suspension system according to the present invention.

Constructed in such manner as shown in section in FIG. 3, the securing member 10 is hung on the shank 11 through the medium of the ball bearing section. More specifically, the shank 11 is formed with a spherical terminal head 17 at its lowest part, a neck part 18 thereabove becoming a round trunk part 16, above which a square stepped part 15 is formed, and a threaded part 11' is constituted further upwards therefrom. Mounted on the terminal head 17 and around the shank 11 is a bearing race 19 in such manner as to be parallel to the spherical portion of the terminal head 17. The upper surface of the bearing race 19 forms a rolling face 19' for balls 21. The balls used are steel balls of about 4 mm in diameter and the number of balls, being five in this case, is changed as occasion demands. Numeral 20 designates a retainer for keeping the balls 21. The lower face of the retainer 20 has a concave spherical surface parallel to the terminal head. On the other hand, the inner side of the top part of the securing member 10 is formed with a curved surface 21' parallel to the balls 21, as if covering them. The central portion of the securing member 10 is provided with a hole 23, through which the neck part as shown in FIG. 5, lies on the central line of the shank 11. The top face 10' of the securing member 10 and the concave impinging face 13' of the cap 13 are also constructed with the spherical center B as a center. Incidentally, it is of course preferable that this impinging face 13' will have a spherical surface congruent with the top face of the securing member 10 all over the whole. With respect to the round truck part 16 of the shank 11 and so long as the cap does not move up and down owing to the swing of the securing member 10, a part of the circumferential surface of the impinging face 13' does not necessarily have to form a spherical surface.

Figure 4:
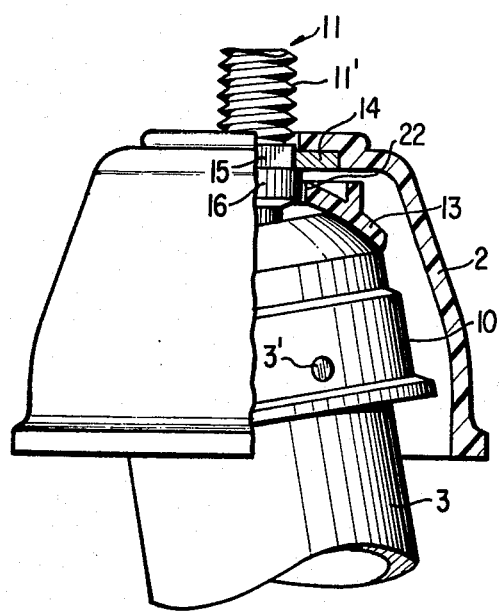
FIG. 4 is a working diagram of a bobbin hanger at the time of swinging, wherein the cap is shown as broken away only at the right half.
Figure 6:
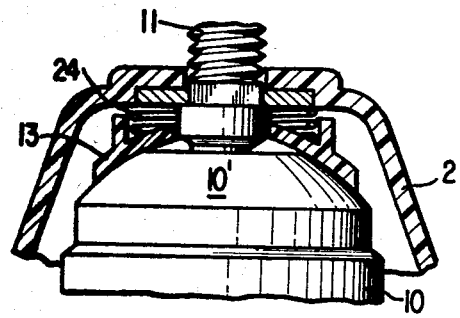
FIG. 6 is a sectional view of the principal part, wherein another means is appended to the present invention.

Consequently, the swing motion of the securing member 10 gets to be performed in an extremely small gap produced between the cap 13 and the shank 11, and the spherical center of this swing motion is identical with the spherical center B of the terminal head 17, so that, if the securing member 10 swings, there is entirely created no gap wherethrough dust intrudes into the impinging face of the cap 13, and, as a result, the ball bearing is able to continue to rotate smoothly and the years of endurance thereof are increased by more than two times compared with conventional manufactures. That is, as shown in FIG. 4, while the securing member 10 swings, the cap 13 strokes over the top face of the securing member 10 at the almost steady posture and prevents the intrusion of dust in addition to its cleaning. Further, so long as the cap 13 is formed with a concave spherical surface at its impinging face 13', its topside face may take any form, so that it does not matter whether the cap 13 will be increased in weight for the sake of stability and providing uniform friction with the stroking spherical surface, or, as shown in FIG. 6 by way of an example, the cap 13 will be actively press-contacted onto the top face of the securing member 10. These kinds of arrangements may perhaps serve in place of inertial rotation brakes used in conventional bobbin hangers.

Since bobbin hangers are to be attached to the creel boards or creel rails of spinning machines are are in use by the hundreds of thousands, they must be light in weight and offered at a low cost as well. To satisfy these demands, normally, the main parts of the trunk body 3, the holding barrel body 4, the ball bearing, exclusive of steel balls, and the like are formed of synthetic resinous materials. But the sorts of synthetic resinous materials hitherto used in the bearing section are such as, for example, polyamide resin, phenol resin, melamine resin, polyimide resin, tetrafluoroethylene resin, and so on. These materials sometimes are molded in simple substances, or sometimes are used in lamination or coated together with other kinds of materials. The reason why these sorts of synthetic resinous materials are adopted is because they possess good slidability, wear proof and heat resisting properties. Synthetic resinous materials on such a level are not worthy of being directly applied to the ball bearing section, such as in the bobbin hanger, which is to be relatively light-weight, to continue the rotation without lubrication for a long term and by low torque, and further to prevent the intrusion of dust. Particularly, polyamide resin, which is hitherto largely used in the ball bearing section of the bobbin hanger, has various flaws that it presents the viscosity in the contact face of the balls with the rolling body, accompanied by a large statical friction, so that it can not maintain smooth rotation without the use of appropriate lubricants, that it can not stand the long term service because of the furtherance of the adsorption of dust in spinning mills due to the lubricants used, and especially that it brings about the wear of the impinging face of the steel balls in the bearing race owing to the adhesion of dust.

Figure 8:
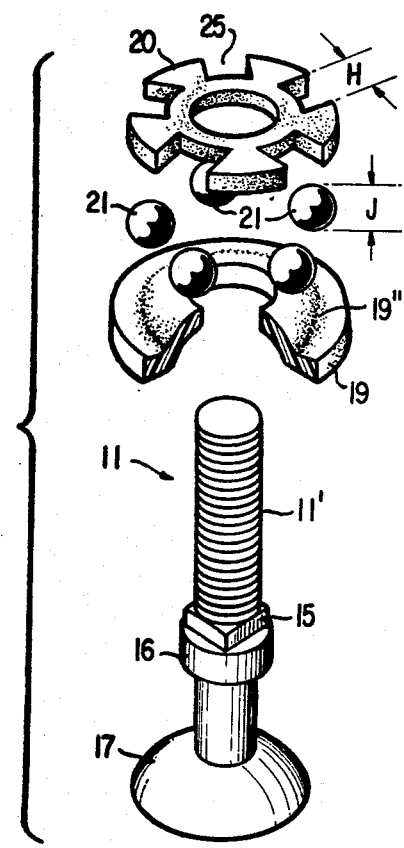
FIG. 8 is an exploded view of a part of a ball bearing section, in development.

Then, the author of the present invention investigated a certain table of analysis of dust in spinning mills and came to have the conception that dust might have to do with the wear of the steel balls. According to the result of analysis, dust consists of short fiber fly, sand, iron, magnesium, aluminum, silicon, and others. Above all, sand and iron were proven to make the impinging face of the steel balls rough, as if sand blast were applied. Then, the author fixed his eyes upon a well-known engineering plastic, or polyacetal resin, of high density and high crystal habit, which has well-balanced mechanical properties and is excellent in fatigue resistance, wear proof and abrasive characteristics. Thus, the author hit upon an idea that the application of this resin to the ball bearing section in the bobbin hanger would be able to bring about higher efficiency than heretofore achieved. The ball used so far in the ball bearing section in the bobbin hanger was about 3 to 3.5 mm in diameter, and the ball bearing itself did not make use of any ball-retainer. As sketched in FIG. 8, the steel balls 21, which were disposed on the bearing race 19, used to be pressed up by the securing member 10 serving here as a bearing race without the provision of a retainer, such as shown by numeral 20 in FIG. 8. Hereupon, it could not help but lead to the generation of the resistance or fricative dust due to the contact friction of the steel ball 21. Seeing that such a device rotated lightly and continued constantly the rotational resistance to some extent, it was evident that it might be adapted, indeed, to a relatively light-weight conventional bobbin for rovings, but the ball bearing of such construction does not serve for an up-to-date bobbin loaded with a large package of roving for a continuous use. Incidentally, the steel ball used in this occasion also was no more than the one of relatively small diameter, as mentioned above, and subsequently the steel ball 21 of like size was ready to produce streaks on the ball race, involving the hindrance to a long term service thereof. Accordingly, the author of the present invention made an experiment with the use of plates (each 10 mm in thickness) made of the aforementioned polyacetal resinous material: how large a diameter is most suitable for the steel ball for use in the ball bearing. The process of the experiment is thus: A steel ball was disposed between the above-mentioned polyacetal resinous plates. Loaded on the upper plate was a weight of 7 lbs. which was almost equal to the maximum weight of the bobbin. Hereafter, the lower plate was put in reciprocating motion, which lasted for 30 hours without a break, at the rate of about 1.7 m/min. Then, the experiment observed the streaks created on the lower plate by the steel ball. The result was that, in case of employing a steel ball of 3.2 mm in diameter as hitherto used, the depth of the streak created was 0.2 mm. This extent of the streak was good for the use, it is true, but not preferable. It was thought that, if the external diameter of the steel ball had been made larger, only the width of the streak might be proportionaly enlarged, but the depth thereof would remain the same.

Then, for trial, another experiment was made under the same conditions as before, but using this time a steel ball of 4 mm in diameter. It was now definitely shown that the depth of the streak created was unexpectedly just 0.05 mm. In other words, the depth of the streak could be reduced to one fourth by simply enlarging the external diameter of the steel ball by 25%. On the other hand, the width of the streak was also nearly the same as before, or rather became more narrow, so the state of the streak was not so serious as to interfere with the use. Further, the ball bearing used in conventional bobbin hangers was such a kind in which the balls were applied with load only in the axial direction of the bobbin hanger, but the regulation of its direction of going away (falling off) from the axis of the bobbin hanger was performed by a groove in which the balls were rolling. So the bearing race 19, shown in FIG. 7, was able to satisfy these requisitions by being formed with an inclined surface 19″, where the impinging face of the ball 21 may come to be diminished in area and the ball 21 itself can roll downward in the direction of going away (falling off) from the shank 11 when applied with load. In this construction, since the face with which the ball impinges upon the bearing race 19 is reduced, the rotation of the ball does not greatly suffer any particular influence from the intruding dust, even if there were a little amount thereof, and the securing member 10 also can rotate while being stably held in exact alignment with the shank 11. As a retainer of the steel ball, the most popular in use was one which holds the outer circumferential face of the ball. Such a type, however, scarcely was applied to the bobbin hanger. The reason was because the afore-mentioned dust in spinning mills would easily cling to the retainer, only to disturb the smooth rotation of the ball. In recent times, since some measure has been taken to prevent the intrusion of dust into the ball bearing section of the bobbin hanger, it is true that the weak points, such as stated above, have been somehow overcome to some extent, and, as a result, the retainer comes to be introduced also into the ball bearing of the bobbin hanger at present. There arises still a problem: How to deal with the relation of the width H (24), in which the retainer should hold the ball, to the external diameter J of the steel ball, with respect to the ball bearing of the bobbin hanger into which dust readily intrudes. Upon examination, it became apparent that the bearing of the bobbin hanger continues preferably to rotate smoothly, even in spinning mills which are apt to become full of dust, when the width H for holding the steel ball of the retaining means is larger by about 10% than the external diameter of the steel ball. Namely, the retainer 20, shown in FIG. 8, was provided with some notches 24 (five notches being seen in the present illustration) for holding the steel balls on its periphery at regular intervals. It was most suitable for the width H of the notch of the retainer to be 4.5 mm when the steel ball 21 was 4 mm in external diameter. That is, the ratio of J to H (J/H) was preferable for the ball bearing of the bobbin hanger when it ranged from 0.85 to 0.95.

Figure 7:
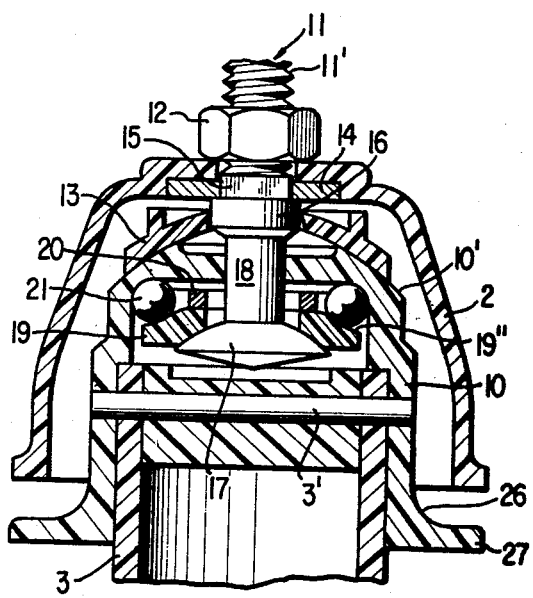
FIG. 7 is a sectional view showing another embodiment of the present invention.

As a countermeasure against the introduction of the ascending air current carrying dust into the skirt of the bobbin hanger, as described before, a part of the securing member 10 applied to the present invention was improved. This improvement, needless to say, is to be comprehended in the present invention. Namely, as shown in FIG. 7, the lower part of the securing member 10 is formed with a flange 27, which constitutes a curved face 26 at its transition point. This flange 27 projects outwards, while keeping a certain clearance with respect to the lower end of the skirt 2, and its circumferential edge nearly falls in line with the outer circumferential edge of the lower end of the skirt 2. In this way, it is possible to prevent the intrusion of the ascending air current by locating the elongated lower part of the rotating securing member 10 below the skirt 2, and therewith to diminish the otherwise accumulated dust on the inner side of the top of the skirt 2 on the ground that the dust is blown away along the curved face 26 formed on the lower part of the securing member 10 by the force of the rotation or mechanical oscillation of the bobbin hanger, even if it intrudes into the outer circumference of the securing member 10. This is the reason why the intrusion of dust into the ball bearing section is better warded off.

The suspension system of the bobbin hanger according to the present invention is constructed in such a manner as mentioned above, so that it is possible to prevent the intrusion of dust into the ball bearing section of a bobbin hanger, therefore providing for the elongation of the service life of the bobbin hanger and guaranteeing uniform draft owing to the smooth and constant rotation, and eventually resulting in the contribution to the augmentation of the quality of the manufacturers and the reduction of the production costs.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A suspension system for rotatably supporting a bobbin holder, comprising:
   a shank forming a spherical bearing-race-receiving face at the lower end thereof with a neck part and a round trunk part being successively formed vertically therefrom;
   a bearing race coaxial with said shank and having a lower concave spherical surface, said bearing race being supported on said spherical bearing-race receiving face of said shank;
   a bobbin securing member having a convex spherical top face, said bobbin securing member being provided with a through-hole for receiving said shank, said through-hole being formed through the top part of said bobbin securing member and receiving said neck part of said shank and providing a broad clearance therebetween;
   ball bearing means disposed between said bobbin securing member and said bearing race, for rotatably supporting said bobbin securing member from said shank through the intermediary of said bearing race; and
   a cap plate being formed with a concave spherical surface substantially coinciding with the convex spherical top face of said bobbin securing member and formed concentrically parallel with said spherical bearing-race-receiving face of the lower end of said shank and having a central opening for receiving said trunk part of said shank, said central opening providing only a narrow clearance between said trunk part of said shank and said cap plate, whereby said cap plate prevents the intrusion of dust from above into the ball bearing section of said suspension system while permitting smooth rotation of said bobbin securing member through said ball bearing.

2. A suspension system for a bobbin holder as set forth in claim 1, further comprising a holding barrel for a bobbin being pivotably supported from the lower end of said bobbin securing member about an axis perpendicular to the axis of said bearing race.

3. A suspension system for a bobbin holder as set forth in claim 2, further comprising a skirt member non-rotatably fixed on said shank, said skirt member being disposed about said bobbin securing member and said cap plate and being circumferentially spaced therefrom to provide sufficient clearance for free rotation and swinging movement of said bobbin securing member therewithin.

4. A suspension system of a bobbin hanger as claimed in claim 3, further comprising a coiled spring disposed between said cap plate placed on the top face of said bobbin securing member and said skirt member.

5. A suspension system for a bobbin holder as claimed in claim 1, wherein said bearing race is shaped in such manner that the impinging faces of the balls thereof are severally contacted with concaved faces inclining in the centrifugal direction, whereby said balls tend to roll down in a similar direction.

6. A suspension system for a bobbin holder as set forth in claim 3, wherein the lower edge of said bobbin securing member extends downward beyond the opening part of said skirt to form a flange at the outer circumference thereof, while being spaced from the edge of said skirt, and the transition part from the external circumferential surface of said bobbin securing member to that of said flange forms a circular curved face.

7. A suspension system for a bobbin holder as set forth in claim 1, wherein said bearing race is molded of polyacetal resin and further comprising a retainer for said ball bearing, said retainer having notched parts which are wider by about 10% than the external diameter of said ball bearings.

* * * * *